United States Patent [19]
Kishi et al.

[11] Patent Number: 6,067,599
[45] Date of Patent: May 23, 2000

[54] TIME DELAYED AUTO-PREMIGERATION OF FILES IN A VIRTUAL DATA STORAGE SYSTEM

[75] Inventors: Gregory Tad Kishi, Oro Valley; Jonathan Wayne Peake, Tucson, both of Ariz.

[73] Assignee: International Business Machines Corporation, Armonk, N.Y.

[21] Appl. No.: 08/865,249

[22] Filed: May 29, 1997

[51] Int. Cl.⁷ .................................................. G06F 12/08
[52] U.S. Cl. .......................... 711/113; 711/118; 711/143; 711/162; 707/204; 714/6
[58] Field of Search .................... 711/113, 118, 711/143, 144, 161, 162, 156; 707/204; 714/6; 713/502, 600

[56] References Cited

U.S. PATENT DOCUMENTS

| | | | |
|---|---|---|---|
| 5,155,835 | 10/1992 | Belsan | 395/425 |
| 5,542,066 | 7/1996 | Mattson et al. | 711/136 |
| 5,581,724 | 12/1996 | Belsan et al. | 395/441 |
| 5,600,816 | 2/1997 | Oldfield et al. | 711/113 |
| 5,615,353 | 3/1997 | Lautzenheiser | 711/136 |
| 5,634,109 | 5/1997 | Chen et al. | 711/143 |
| 5,636,355 | 6/1997 | Ramakrishnan et al. | 711/113 |

*Primary Examiner*—Hiep T. Nguyen
*Attorney, Agent, or Firm*—Robert M. Sullivan

[57] ABSTRACT

A virtual data storage system provides a method and apparatus for premigrating host-originated data files initially stored in a cache storage to selected storage volumes within a storage subsystem. A premigration list includes an entry for each cache data file eligible to be premigrated, or copied, to the storage subsystem. Each entry includes a data file identifier, a cache storage location, and a premigration delay criterion. The purpose of the premigration delay criterion is to ensure that the data files are written to the storage subsystem in a timely manner, but to also allow the host processing system to subsequently re-access data files written to the virtual data storage system without interference and delay from the premigration process. The cache data files are not premigrated until the corresponding premigration delay criterion has elapsed, or exceeded a predetermined threshold. In this manner, the premigration delay criterion can be adjusted as warranted by the performance of virtual data storage system or the host processing system.

30 Claims, 4 Drawing Sheets

TIME DELAYED AUTO-PREMIGERATION OF FILES IN A VIRTUAL DATA STORAGE SYSTEM

FIELD OF THE INVENTION

The present invention relates generally to virtual tape storage systems. More particularly, the present invention concerns premigrating data files by copying the files from a direct access storage device (DASD) serving as a cache to physical tape storage volumes. The present invention uses a programmable delay criterion and a premigration list to prevent an immediate premigration of a data file recently written to the cache, thereby allowing immediate read access of the file from the cache.

BACKGROUND OF THE INVENTION

Data processing systems typically require a large amount of data storage. These systems often comprise multiple host processors concurrently storing data to multiple storage volumes through multiple drive units. The data storage within these systems often includes removable media, such as magnetic tape or optical disk, since it is useful for data that must be stored for long periods of time, data that is infrequently accessed, or data that is backed-up or migrated from more accessible storage media, such as electronic memory or DASD.

Virtual data storage systems, more commonly implemented as virtual tape storage (VTS) systems, have recently been developed to increase the efficiency and economics of tape storage systems. Tape storage systems which attach to many host processors typically require many tape drives to accommodate concurrent demands made by separate host processors for accessing separate tape storage volumes. Accordingly, the tape storage system may utilize the tape drives in bursts of high activity separated by intervals of little activity. VTS systems overcome this problem by providing interfaces to the host processors for addressing many more tape drives than actually exist within the storage subsystem. The host processors transfer data files to the attached VTS system as tape volumes, or logical volumes. The VTS system first stores the logical volumes as files in a cache storage, such as a direct access storage device (DASD) or an electronic memory, and subsequently writes the data files from the cache to the tape storage subsystem. When the logical volume has been stored in the cache storage, it appears to the host processor that the logical volume has been stored as a tape volume in the VTS system. The VTS system manages the migration of the data file to a tape storage volume, and selects which physical tape drive is used to write the data to tape.

The VTS system provides quicker access to data files stored in the cache storage. When a host processor reads a tape volume that remains stored as a file in the cache storage, a "cache-hit" allows the VTS system to transfer the corresponding file to requesting host processor in a fraction of the time required to read the logical volume from the tape storage. Thus, the VTS system must also manage the cache storage and the tape storage such that the more frequently requested tape volumes reside in the cache storage. Higher performance, more efficient VTS systems premigrate files from the cache storage to the tape storage subsystem. That is, the VTS system copies the data file to a tape storage volume, but does not remove the file from the cache storage. In this scheme, the VTS system has transferred the logical volume to the tape storage, but has kept a copy in the cache storage, providing faster host access to the logical volume.

The VTS system, however, can maintain two copies of the data for only a small subset of the logical volumes transferred from the host processors.

VTS systems typically employ a scheme for managing which logical volumes remain in the cache storage by migrating the least recently used files from the cache storage to the tape storage subsystem. When the VTS system migrates a DASD file to a tape storage volume, the data file must be "opened". When the VTS system opens the data file, it prevents the host processors from accessing the same file to ensure data integrity. That is, opening a file is a mechanism for preventing, or locking out, other system components from contending for the file, and more importantly, from modifying the file. Thus, copying the data file to a storage volume within the tape storage subsystem prevents the host processor from reading the data file, thereby delaying host access to the logical volume and degrading the performance of the data processing system.

Many times, host applications perform re-access a volume that was just written. This volume re-access typically occurs very soon after the volume has been written to the data storage system. In the VTS system, the volume re-access would be delayed if the data file was immediately copied to the tape storage subsystem, since the VTS system would lock out the host processor from accessing the cache storage copy of the logical volume. Therefore, a method and system is needed within the VTS system to copy the data file from the cache storage to the tape storage subsystem such that delays to host access of the data file are minimized and the data integrity within the data file is maintained.

SUMMARY OF THE INVENTION

An object of the present invention is to provide an improved method in a virtual data storage system for storing host-originated data files, or logical volumes, in a cache storage and subsequently copying, or premigrating, the data files to a storage volume within a tape storage subsystem. The method premigrates the data files as logical volumes to the tape storage such that the premigration minimizes delays to a host processing system accessing the data file.

Another object of the present invention is to provide a virtual data storage system for storing host-originated data files, or logical volumes, in a cache storage and subsequently copying, or premigrating, the data files to a storage volume within a tape storage subsystem. The virtual data storage system premigrates the data files as logical volumes to the tape storage such that the premigration minimizes delays to a host processing system accessing the data file.

A first embodiment of the present invention includes a method within a virtual data storage system for storing host-originated data files, or logical volumes, in a cache storage and subsequently copying, or premigrating, the data files to a storage volume within a storage subsystem. The virtual data storage system includes a storage interface, a cache storage, a plurality of drives, a plurality of storage volumes, a database storage, and a storage manager, and receives data files from an attached host processing system. The method premigrates the data files as logical volumes to the storage subsystem such that the premigration minimizes delays to the host processing system accessing the data file. The method builds a premigration list, each entry in the list corresponds to a data file which is eligible to be premigrated to the storage subsystem. The method also places a premigration delay criterion in each entry of the premigration list. The method selects an entry within the premigration list and measures its premigration eligibility against the premigration delay criterion to determine if the corresponding data file should be copied to the storage subsystem.

Another embodiment of the present invention includes a virtual data storage system for storing host-originated data files, or logical volumes, in a cache storage and subsequently copying, or premigrating, the data files to a storage volume within a storage subsystem. The virtual data storage system receives data files from an attached host processing system and includes a plurality of storage volumes, the cache storage, a plurality of drives, a database storage, and an interconnected storage manager, or storage controller. The virtual data storage system premigrates the data files as logical volumes to the storage subsystem such that the premigration delays to the host processing system accessing the data file. The storage manager builds a premigration list, where each entry in the list corresponds to a data file which is eligible to be premigrated to the storage subsystem. Each entry in the list corresponds to a data file which is eligible to be premigrated to the storage subsystem, and contains a premigration delay criterion. The storage manager selects an entry within the premigration list and measures its premigration eligibility against the premigration delay criterion to determine if the corresponding data file should be copied to the storage subsystem.

A still another embodiment of the invention includes an article of manufacture for use in a virtual data storage system. The virtual data storage system includes a storage manager, or storage controller, for storing host-originated data files, or logical volumes, in a cache storage and subsequently copying, or premigrating, the data files to a storage volume within a storage subsystem. The data files are premigrated as logical volumes to the storage subsystem storage such that the premigration minimizes delays to a host processing system accessing the data file. The article of manufacture comprises a computer-readable storage medium tangibly embodying a program of executable computer instructions. The computer instructions may cause the storage manager to execute the method steps described in the first embodiment of the invention.

The present invention affords its users with a number of distinct advantages. Importantly, the present invention provides an adjustable, premigration delay criterion for each data file received from an attached host processing unit and stored in a cache storage within a virtual data storage system. The purpose of the premigration delay criterion is to ensure that the host-originated data files are written to the desired storage volumes within the virtual data storage system in a timely manner, but to also allow the host processing system to immediately re-access the data files after they are written to the virtual data storage system without interference or delay from a premigration process.

The foregoing and other objects, features, and advantages of the invention will be apparent from the following more particular description of a preferred embodiment of the invention, as illustrated in the accompanying drawings.

DETAILED DESCRIPTION

Figure 1:
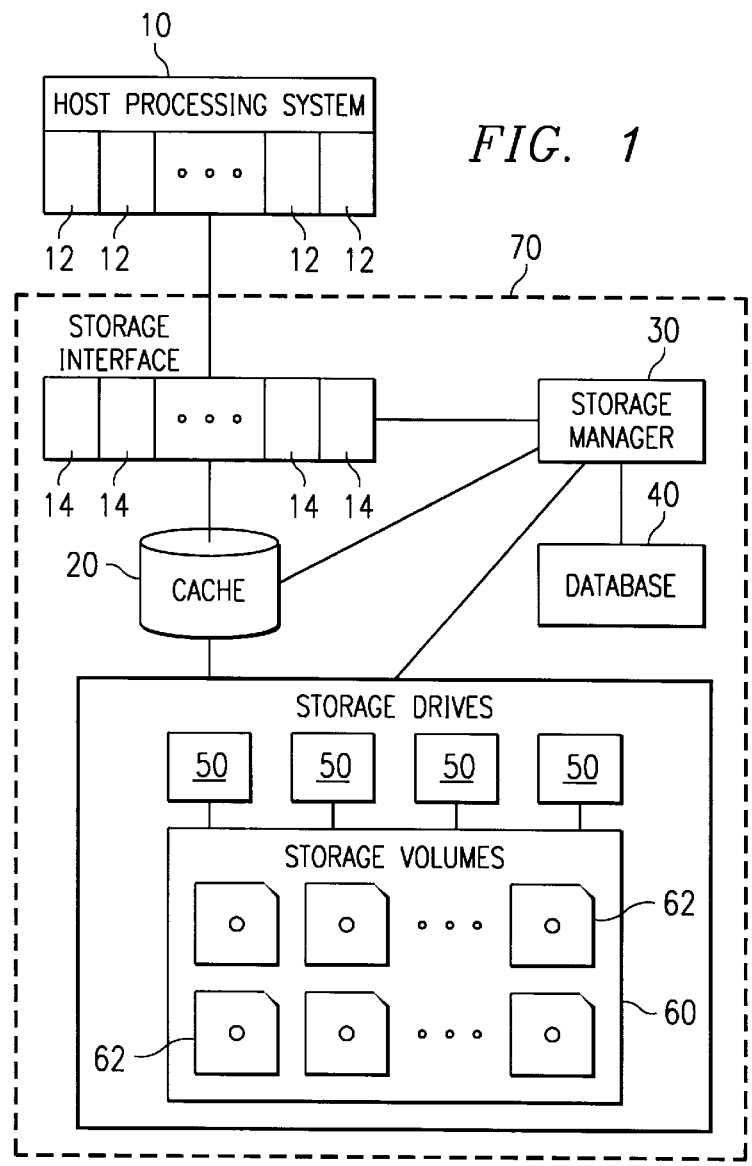
FIG. 1 is a block diagram showing an interconnection of functional components of a virtual data storage system for premigrating host-originated logical volumes from a cache storage to a storage subsystem in accordance with the present invention.

Referring more particularly to the drawings, like numerals denote like features and structural elements in the various figures. The invention will be described as embodied in a virtual data storage system for storing host-originated data files, or logical volumes, in a cache storage and subsequently copying, or premigrating, the data files to one of a plurality of storage volumes. Turning now to FIG. 1, a block diagram representing a virtual data storage system 70, for example the IBM 3494 Virtual Tape Storage System, is shown coupled to a host processing system 10. Applications programs running within the host processing system 10 generate data to be stored as logical volumes within the virtual data storage system 70. The host processing system 10 may be embodied by a variety of types and numbers of processing units, such as a mainframe computer, a personal computer, or a workstation. The virtual data storage system 70 includes a storage manager, or storage controller, 30 interconnected to a storage interface 14, a cache 20, a database storage 40, a set of drive units 50, and a storage subsystem 60 having a plurality of storage volumes 62. The storage manager 30 is also coupled to the host processing system 10, and may comprise a digital processing apparatus such as a microprocessor, personal computer, or more advanced processing machine. The storage volumes 60 may consist of various types of sequential storage media, such as magnetic tape or optical disk. The drive units may also include magnetic tape drives, such as the IBM 3590 High Performance tape drive, or optical disk drives.

The virtual data storage system 70 appears to the host processing system 10 as multiple storage devices, such as 32 IBM 3490 tape storage devices, each with a unique address 12 from the host processing unit 10. The storage interface 14 within the virtual data storage system 10 provides a data path for each of these virtual devices 14. The host processing system 10 writes a data file to a specific virtual storage device 12 within the virtual data storage system 70. The data file is transferred along a selected data path 14 corresponding to the virtual device address 12. The storage manager 30 directs the host-originated data file to the cache storage 20, recording the data file identifier and its cache storage position in a directory within the cache storage.

The data file must eventually be written to a selected storage volume 62 within the storage subsystem 60. The storage manager 30 also controls the transfer of data files between the cache storage 20 and the storage subsystem 60. The data files pass through three stages in the virtual data storage system 70: 1) resident files, data files stored only in the cache storage 20; 2) premigrated files, data files stored in the cache storage 20 and copied to a selected storage volume 62; and 3) migrated files, data files stored only on a selected storage volume 62 within the storage subsystem 60. The storage manager 30 controls the initial premigration and eventual migration of data files from the cache storage 20 to the storage subsystem 60. The storage manager 30 also maintains reference information and storage volume location information about premigrated and migrated files within a database storage 40. When the host processing system 10 requests a logical volume, or data file, from the virtual data storage system 70, resident and premigrated files are accessed from their location in the cache storage 20. Migrated files are recalled from their location in the storage subsystem 60 to the cache storage 20 and accessed by the host processing system 10 through the cache storage 20. Thus, write operations and recall operations insert data files into the cache storage 20, while migration operations remove data files from the cache storage 20.

Figure 2:
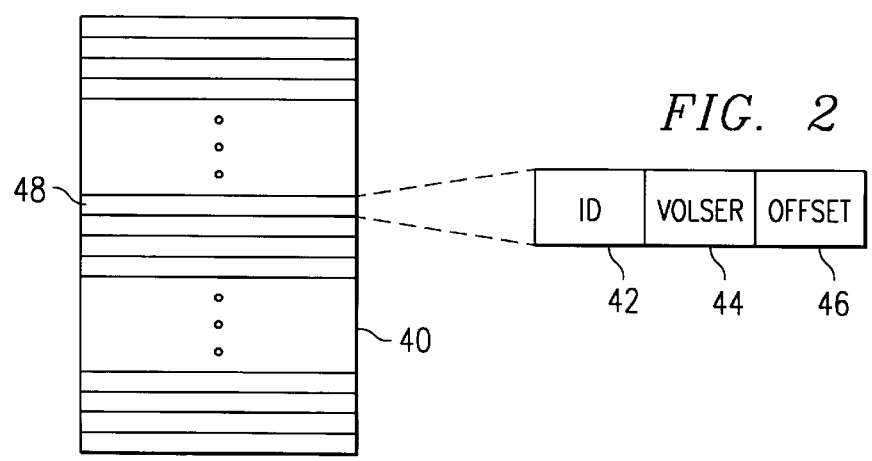
FIG. 2 is a block diagram showing a database storage as depicted in the virtual data storage system of FIG. 1, in accordance with the present invention.

FIG. 2 shows a block diagram representing the database, or catalog, within the database storage 40. The database 40 contains an entry for each data file received from the host processing system 10 and written to a storage volume 62 within the storage subsystem 60. FIG. 2 also shows an exploded view of an exemplary entry 48 into the database 40. The entry includes a data file identifier 42, a storage volume identifier 44, and a storage volume offset 46. The data file identifier 42 identifies a particular logical volume, or data file, received from the host processing system 10. The storage volume identifier 44 specifies the storage volume 62 where the data file was eventually written. This identifier 44 is typically a storage volume serial number, or a storage volume label, which uniquely identifies the selected storage volume 62 in the storage subsystem 60. The storage volume offset 46 indicates a position within the sequential media of the storage volume 62 where the data file is stored. An offset onto the storage volume 62 is necessary, since volume stacking now allows multiple logical volumes, including multiple data files, to be stored on a single physical storage volume 62. The combination of the storage volume identifier 44 and the storage volume offset 46 effectively provide a pointer to the logical volume, or data file, within the virtual data storage system 70. Accordingly, the database storage 40 is very small relative to the storage capacity of the storage subsystem 60, since a pointer to the data file occupies a very small fraction of the storage needed for the actual data file.

Figure 3:
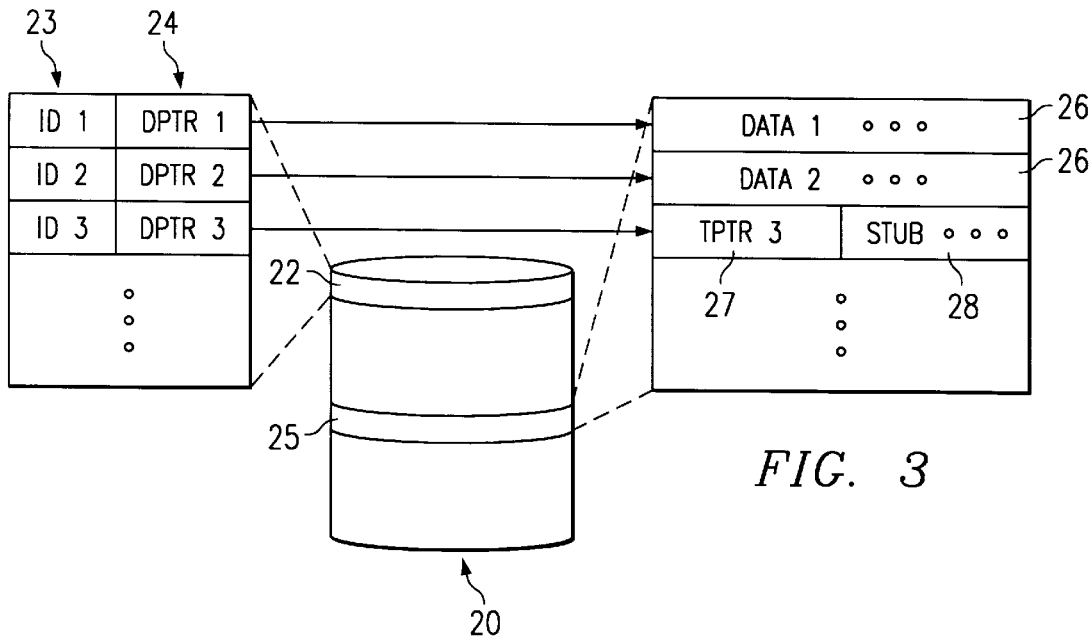
FIG. 3 is a block diagram representing storage of logical volumes as data files in a cache storage as depicted in the virtual data storage system of FIG. 1, in accordance with the present invention.

FIG. 3 shows a block diagram representing the storage of logical volumes as data files in the cache storage 20, including an exploded view of a cache directory 22 and a main storage area 25. The cache storage 20 includes a cache directory 22 for indexing to the data files 26 and a main storage 25 for storing the data files 26. The cache directory 22 includes an entry for each data file stored within the virtual data storage system 70. Each entry 22 contains a data file identifier 23 and a pointer 24 to the data file 26 within the cache storage 20. The main storage area 25 of the cache storage 20 contains the data files 26. The main cache storage 25 contains resident files 26, premigrated files 26, and reference pointers 27 to migrated files 28. The cache storage 20 contains the actual data for resident and premigrated files 26, but only contains a data stub 28 for migrated files. The data stub 28 includes a pointer 27 to the data file location on a selected storage volume 62 within the storage subsystem 60. As described earlier, the storage manager 30 directs the transfer of data files 26 within the virtual data storage system 70. The storage manager 30 also decides when to premigrate, and migrate, data files 26 from the cache storage 20 to the storage subsystem 60.

Figure 4:
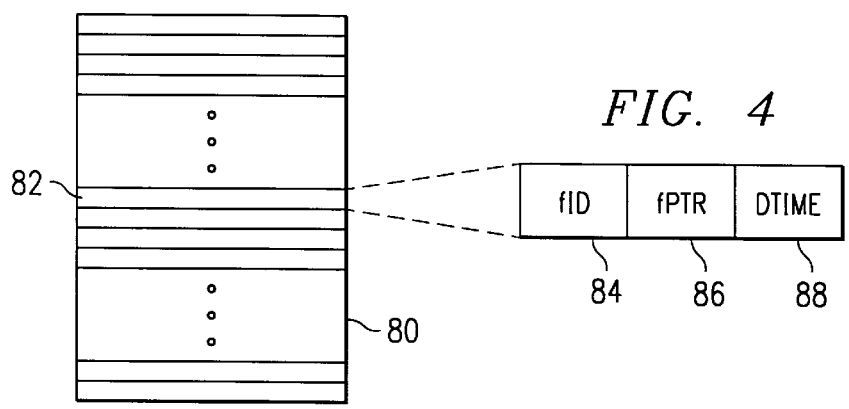
FIG. 4 is a block diagram representing a premigration list containing entries identifying cache data files eligible for premigration to storage volumes, in accordance with the present invention.

Referring to FIG. 4, a block diagram is shown representing a premigration list 80 used by the storage manager 30 to determine when to copy data files 26 from the cache storage 20 to the storage subsystem 60. The premigration list 80 includes an entry 82 for each data file 26 stored within the cache storage 20 which is eligible to be copied, or premigrated, to the storage subsystem 60, and has not yet been premigrated. Each entry 82 includes a data file identifier 84, an optional cache storage pointer 86 corresponding to the data file 26, and a premigration delay criterion 88 unique to the individual data file 26. The premigration delay criterion 88 is used to delay the storage manager from copying, or premigrating, the data file 26. Until this criterion is met, the host processing system is allowed to access the data file 26, but the storage manager 30 is prohibited from premigrating the data file 26. Thus, the storage manager 30 cannot interfere with host access to the data file 26 for a predetermined interval. The premigration delay criterion 88 can represent a time interval for delaying premigration, or it may represent a percentage cache storage 20 capacity occupied by either resident or premigrated files 26, or it may be a combination of time and storage capacity. The storage manager 30 may also reinitialize the corresponding premigration delay criterion 88 whenever the host processing system 10 accesses the data file 26.

Figure 5A:
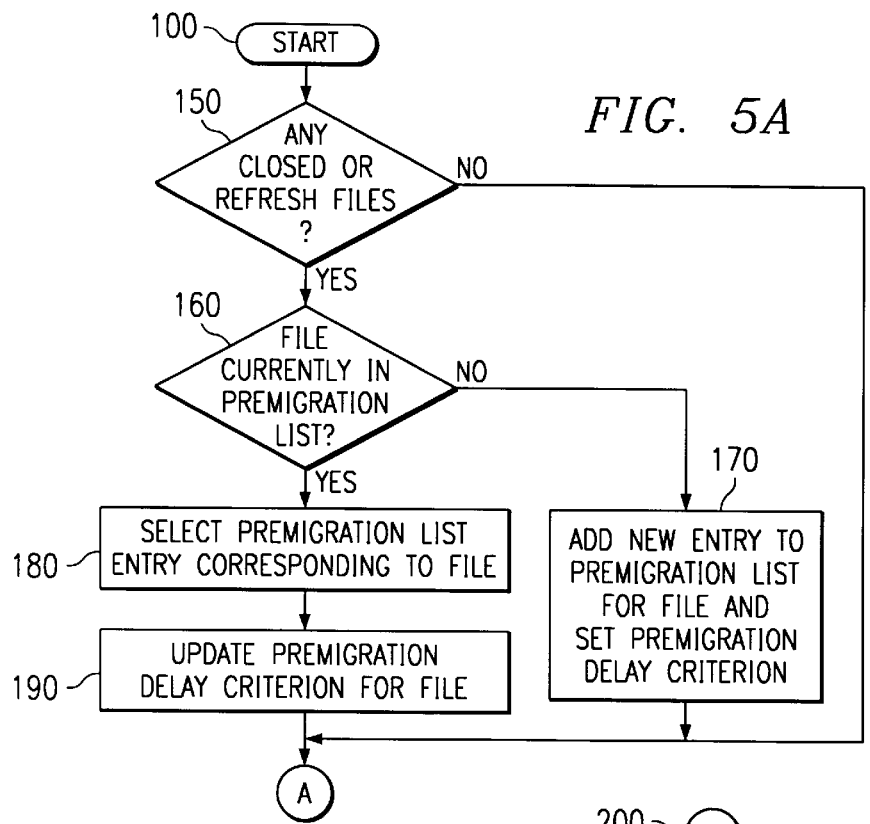
FIGS. 5A and 5B show a flow diagram depicting an illustrative sequence of operational steps used to manage and update a premigration list according to the present invention.
Figure 5B:
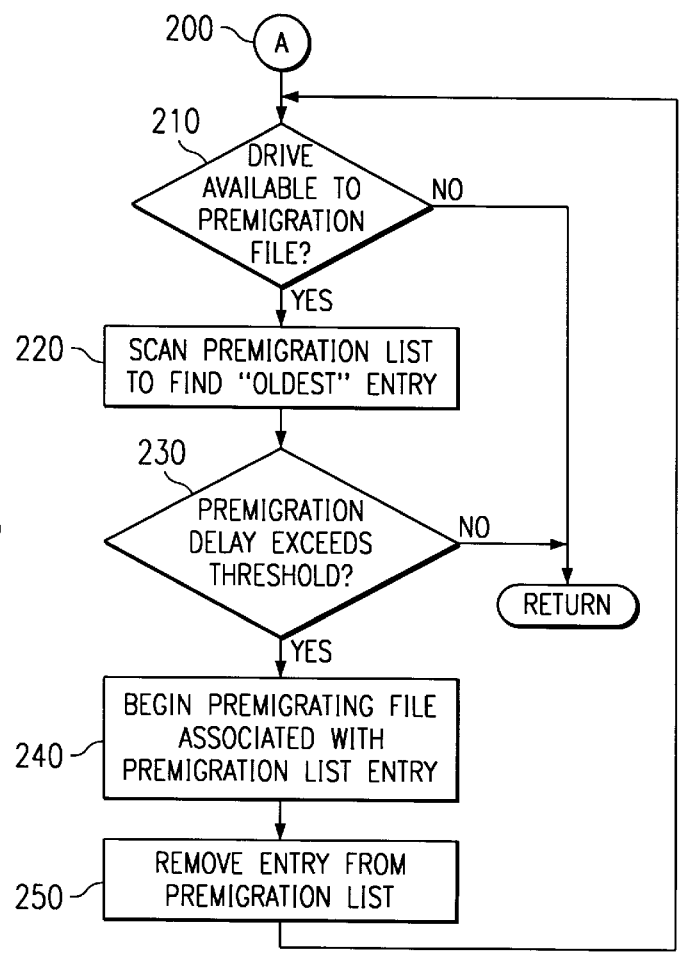

FIGS. 5A and 5B describe a method 100, within the virtual data storage system 70, for managing a premigration list 80. The storage manager 30 typically manages the premigration of data files 26 to the storage subsystem 60, and thus, typically performs the method steps described herein. A step 150 determines if any resident files 26 have been closed since the method 100 was last invoked. In a particular embodiment of the present invention, the data file identifier in the database storage 40 and the cache directory 22 could be scanned to reveal the closed file status. Alternatively, an incoming message queued could be scanned to find messages posted earlier by the storage manager 30 indicating that particular data files were closed. Step 150 also determines whether a previously premigrated file 26 needs to be refreshed, or reinserted into the premigration list 80, because the previous premigration failed. A step 160 determines if the selected data file 26, either closed or refreshed, contains a current entry 82 in the premigration list 80. If so, a step 180 selects the premigration list entry 82 corresponding to the selected data file 26. A step 190 updates the premigration delay criterion 88. The premigration delay criterion 88 is typically reinitialized if the data file was just recently closed. As stated earlier, the premigration delay criterion 88 is used to ensure that data files 26 are written to tape in a timely manner, but to also allow the host processing unit 10 to immediately read a data file 26 after writing it to the virtual data storage system 70. A step 170 adds a new entry 82 to the premigration list 80, including a premigration delay criterion 88, for the corresponding data file 26.

In FIG. 5B, a step 200 represents that at least one data file 26 is eligible to be premigrated, or copied, from the cache storage 20 to a selected storage volume 62 within the storage subsystem 60. As stated earlier, the storage manager 30 typically manages the premigration of data files 26 to the storage subsystem 60, and thus, typically performs the method steps described herein. A step 210 determines whether a physical drive unit 50 is available to write the data file 26 to the selected storage volume 62. If no drive units 50 are available, the method 100, 200 returns to a calling routine, or a task dispatcher in the storage manager 30. As an example of drive unavailability, the drives 50 may be busy recalling data files 26 from the storage subsystem 60, or busy reclaiming storage volumes 62 within the storage subsystem 60. Otherwise if a drive 50 is available, a step 220 scans the premigration list 80 to find the entry 82 with the "oldest" premigration delay criterion 88.

A step 230 determines whether the premigration delay criterion 88 has elapsed for the "oldest" premigration list entry 82. That is, the premigration delay criterion 88 is compared to a premigration delay threshold. If the premigration delay threshold has been exceeded, the premigration delay criterion 88 has elapsed and a step 240 begins premigrating the corresponding data file 26. In this case, the storage manager 30 loads a selected storage volume 62 into the available drive unit 50 and directs the data file 26 to be copied from its cache storage location 24 to the available drive 50. The drive 50 then writes the data file 26 to the desired location on the selected storage volume 62. The storage manager 30 updates the database 40 to reflect the storage volume location 46 for the premigrated data file 26 and to indicate that the data file 26 is no longer a closed file during the premigration process. The storage manager 30 also updates the cache directory entry 22 of the data file 26 to indicate that it is a premigrated data file. The corresponding cache storage pointer remains unchanged, since the premigrated data file remains in the cache storage 20. A step 250 removes the premigration list entry 82 for the premigrated data file 26. The method 100, 200 then continues to step 210 to determine if another drive 50 is available to premigrate another eligible data file 26.

Figure 6A:
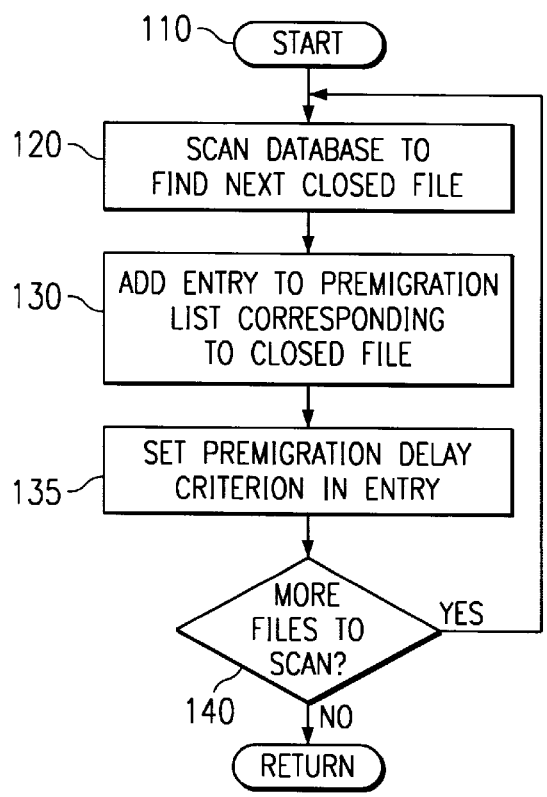
FIG. 6A shows a flow diagram depicting an illustrative sequence of operational steps used to initialize a premigration list according to the present invention.

In FIG. 6A, a method 110 is shown to initialize, or build, the premigration list 80. A step 120 scans the database storage 40 and the cache directory 22 to find resident data files 26 that have been closed by the host processing system 10. Files typically can be opened, read, written, modified, or closed by the host processing system 10. These file statistics can be kept in the data file identifier for each data file 26 in either the cache directory entry 22 or the database entry 48. A step 130 adds an entry 82 to the premigration list 80 for each resident data file 26 with a closed file status. The corresponding data file identifier 84 and optional cache storage location 86 are stored in the premigration list entry 82. A step 135 sets the premigration delay criterion 88 for the new entry 82. When the premigration list 80 is being initialized, the premigration delay criterion is typically set to a default value, or threshold. A step 140 determines if more data files 26 remain to be scanned. If so, the method 110 continues at step 120. Otherwise if no more data files 26 remain to be searched, the method 110 returns to either a calling routine, a task dispatcher, or a similar program within the storage manager 30.

Figure 6B:
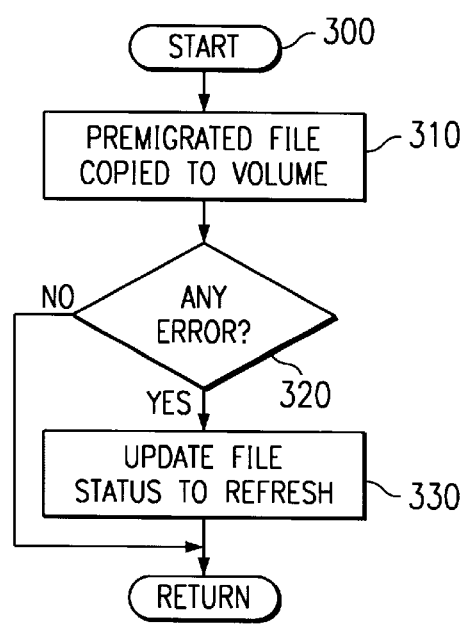
FIG. 6B shows a flow diagram depicting an illustrative sequence of operational steps used to reinsert an entry to the premigration list when a failure occurs during the premigration of the corresponding cache data file according to the present invention.

Referring to FIG. 6B, a method 300 is shown to classify a premigrated data file 26 as refreshed file status, requiring the data file 26 to be reinserted into the premigration list 80 because a failure occurred during an earlier attempt to premigrate the data file 26. The method 300 is typically invoked by a task dispatcher running within the storage manager 30 when the premigration of the data file 26 has completed. A step 310 indicates that an attempt to premigrate a previously eligible data file 26 has been completed. A step 320 determines whether any error occurred during the premigration attempt. Typically, error codes can be stored within control structures of the storage manager 30. The storage manager 30 then simply checks the associated error structures for any indications that the completed premigration encountered an error. If an error did occur, a step 330 updates the file status associated with the premigrated file that failed. The storage manager 30 updates the file status in the data file identifier 23, 42 to indicate that the premigrated file 26 must be recopied to the storage subsystem 60. As stated earlier, changing the file status will allow the method 200 for managing the premigration list 80 to reinsert a premigration list entry 82 for the corresponding data file 26. Otherwise if the previous premigration completed successfully, the method 300 simply returns.

Figure 7:
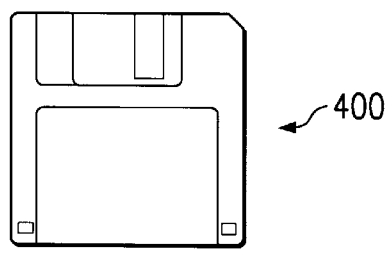
FIG. 7 shows an exemplary article of manufacture according to the present invention.

FIG. 7 depicts a storage medium 400 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

Using the foregoing specification, the present invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hardwired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the invention has been particularly shown and described with reference to preferred embodiments thereof, it will be understood by those skilled in the art that various changes in form and details may be made therein without departing from the spirit and scope of the invention. For example, the premigration list can be refreshed periodically. The premigration delay criterion can be influenced by the size of the data file. In addition, the premigration list entry can store a variable to be measured against the premigration delay criterion, instead of the actual criterion, and then the criterion can be used in the decision making of the method and the apparatus. Finally, message functions between a first and second control program, or process, can be used to communicate the closed and refreshed file status.

What is claimed is:

1. A method in a virtual storage system for premigrating data files stored in a cache disk storage to a plurality of removable storage volumes, said virtual storage system having a storage manager for receiving said data files from a host processing system and directing said data files between said cache disk storage and said plurality of removable storage volumes, said method comprising steps of:

(a) selecting a premigration delay criterion for each said data file to delay said premigrating of said data file from said cache disk storage and allow said host processing system read back access of said data file without interference from said premigrating;

(b) maintaining cache storage location information and said premigration delay criterion in a premigration list, said premigration list including an entry for each said data file stored in said cache disk storage;

(c) periodically checking whether said premigration delay criterion has elapsed for each said entry in said premigration list; and (d) reinitializing said premigration delay criterion for each said data file accessed in said cache disk storage in response to a read request from said host processing system.

2. The method in claim 1 further comprising:

(f) removing said entry in said premigration list corresponding to said data file copied from said cache disk storage to said selected removable storage volume.

3. The method in claim 2 further comprising:

(g) reinserting said entry in said premigration list corresponding to said data file which encountered an error during said premigrating step (f), said reinserted entry including said premigration delay criterion.

4. The method in claim 2 further comprising:

(h) maintaining a data file type and a cache storage pointer in a cache directory, each entry in said cache directory corresponding to each said data file stored in said cache disk storage.

5. The method in claim 4 wherein the step (h) further comprises indicating a resident file as said data file type for each said data files stored in said cache disk storage but not copied to one of said plurality of removable storage volumes.

6. The method in claim 4 wherein the step (h) further comprises indicating a premigrated file as said data file type for each said data file stored in said cache disk storage and copied to one of said plurality of removable storage volumes.

7. The method in claim 6 wherein the step (c) further comprises initializing said premigration list by scanning said cache directory and adding a premigration list entry for each said cache directory entry indicating said resident file as said data file type.

8. The method of claim 7 wherein said premigration delay criterion comprises an amount of elapsed time from when said data file was most recently accessed by said host processing system.

9. The method of claim 7 wherein said premigration delay criterion comprises an amount of said cache storage occupied by said resident files.

10. The method of claim 7 wherein said premigration delay criterion comprises an amount of said cache storage occupied by said premigrated files.

11. The method in claim 3 further comprising:

(i) maintaining reference information and storage volume location information in a database storage for each said data file stored in said plurality of removable storage volumes.

12. The method in claim 11 further comprising:

(j) determining a least recently used data file when a cache storage threshold is reached, said least recently used data file selected from said data files which have been premigrated;

(k) replacing said least recently used data file in said cache disk storage with said storage volume location information corresponding to said least recently used data file; and (l) indicating a migrated file as said data file type for said least recently used data file.

13. The method in claim 1 further comprising:

(e) premigrating said data file from said cache disk storage to a selected removable storage volume when said premigration delay criterion has elapsed for said data file by copying said data file to an available storage device, said available storage device writing said data file as a logical volume to said selected removable storage volume loaded therein, said data file also remaining in said cache disk storage.

14. A virtual storage system receiving data files from a host processing system comprising:

a storage interface coupled to said host processing system, said storage interface appearing as a plurality of virtual storage devices to said host processing system, each said virtual storage device addressable by said host processing system;

a cache disk storage for initially storing each said data file received from said host processing system;

a plurality of removable storage volumes for ultimately storing said data files as logical volumes;

at least one storage device for transferring said data files between said cache disk storage and at least one selected removable storage volume, said selected removable storage volume loaded into said storage device;

a premigration list including a cache storage location and a premigration delay criterion for each said data file, each entry in said premigration list corresponding to each said data file stored in said cache disk storage; and a storage manager interconnected to said storage interface, said cache disk storage, said at least one storage device, and said premigration list, said storage manager directing each said data file between said storage interface and said cache disk storage, said storage manager periodically checking whether said premigration delay criterion has elapsed for each said entry in said premigration list, said storage manager reinitializing said premigration delay criterion corresponding to said data file that is accessed in said cache disk storage in response to a read request from said host processing system, said storage manager premigrating an eligible data file by copying said eligible data file to said selected removable storage volume when said premigration delay criterion has elapsed for said data file, said eligible data file also remaining in said cache disk storage.

15. The virtual data storage system in claim 14 wherein said storage manager removes said entry in said premigration list corresponding to said eligible data file premigrated to said selected removable storage volume from said cache storage.

16. The virtual data storage system in claim 15 wherein said storage manager reinserts said entry in said premigration list corresponding to said eligible data file when an error occurred during said premigrating of said eligible data file, said reinserted entry including said premigration delay criterion.

17. The virtual data storage system in claim 14 wherein said cache disk storage further comprises:

a cache directory having an entry for each said data file stored in said cache disk storage, each entry including a data file type and a cache storage pointer.

18. The virtual data storage system in claim 17 wherein said storage manager sets said data file type as a resident file for each said data file stored in said cache disk storage but not premigrated to one of said plurality of removable storage volumes.

19. The virtual data storage system in claim 17 wherein said storage manager sets said data file type as a premigrated file for each said data file stored in said cache disk storage and premigrated to one of said plurality of removable storage volumes.

20. The virtual data storage system in claim 19 wherein said storage manager initializes said premigration list by scanning said cache directory and adding a premigration list entry for each said cache directory entry indicating said data file type as said resident file.

21. The virtual data storage system in claim 14 wherein said premigration delay criterion comprises an amount of elapsed time from when said data file was most recently accessed by said host processing system.

22. The virtual data storage system in claim 14 wherein said premigration delay criterion comprises an amount of said cache storage occupied by said resident files.

23. The virtual data storage system in claim 14 wherein said premigration delay criterion comprises an amount of said cache storage occupied by said premigrated files.

24. The virtual data storage system in claim 15 further comprising:

a database storage having an entry for each said data file stored in said plurality of storage volumes, each entry including a file identifier and a file location with said plurality of removable storage volumes.

25. The virtual data storage system in claim 24 wherein said storage manager determines a least recently used data file when a cache storage threshold is reached, said least recently used data file selected from said data files which have been premigrated, said storage manager also replacing said least recently used data file in said cache disk storage with said storage volume location information corresponding to said least recently used data file, said storage manager also setting said data file type to a migrated file for said least recently used data file.

26. The virtual data storage system in claim 14 wherein said removable storage volumes are magnetic tape cartridges.

27. The virtual data storage system in claim 14 wherein said removable storage volumes are optical disk cartridges.

28. An article of manufacture for use in a data storage system, said data storage system including a storage manager for receiving data files from a host processing system, storing said data files in a cache disk storage, and copying said data files to a plurality of removable storage volumes, said article of manufacture comprising a computer-readable storage medium tangibly embodying a program of executable computer instructions which may cause said storage manager to:

(a) select a premigration delay criterion for each said data file to delay a premigration of said data file from said cache disk storage and allow said host processing system read back access to said data file without interference from said premigration;

(b) maintain a cache storage location and said premigration delay criterion in a premigration list, said premigration list including an entry for each said data file stored in said cache disk storage;

(c) periodically check whether said premigration delay criterion has elapsed for each said entry in said premigration list; and (d) reinitialize said premigration delay criterion corresponding to said data file that is accessed in said cache disk storage in response to a read back request from said host processing system.

29. The article of manufacture in claim 30 wherein said program of executable computer instructions may further cause said storage manager to:

(h) maintain a cache directory having an entry for each said data file stored in said cache disk storage, each said entry including a data file type and a cache storage pointer; and (I) maintain a database storage having an entry for each said data file stored in said plurality of removable storage volumes, each entry including a file identifier and a file location within said plurality of removable storage volumes.

30. The article of manufacture in claim 28 wherein said program of executable computer instructions may further cause said storage manager to:

(e) premigrate an eligible data file by copying said eligible data file to a selected removable storage volume when said premigration delay criterion has elapsed for said eligible data file, said eligible data file also remaining in said cache disk storage;

(f) remove said entry in said premigration list corresponding to said eligible data file premigrated to said selected removable storage volume; and (g) reinsert said entry in said premigration list corresponding to said eligible data file when an error occurred during said premigrating of said eligible data file, said reinserted entry including a minimal premigration delay criterion.

* * * * *